Figure 1:
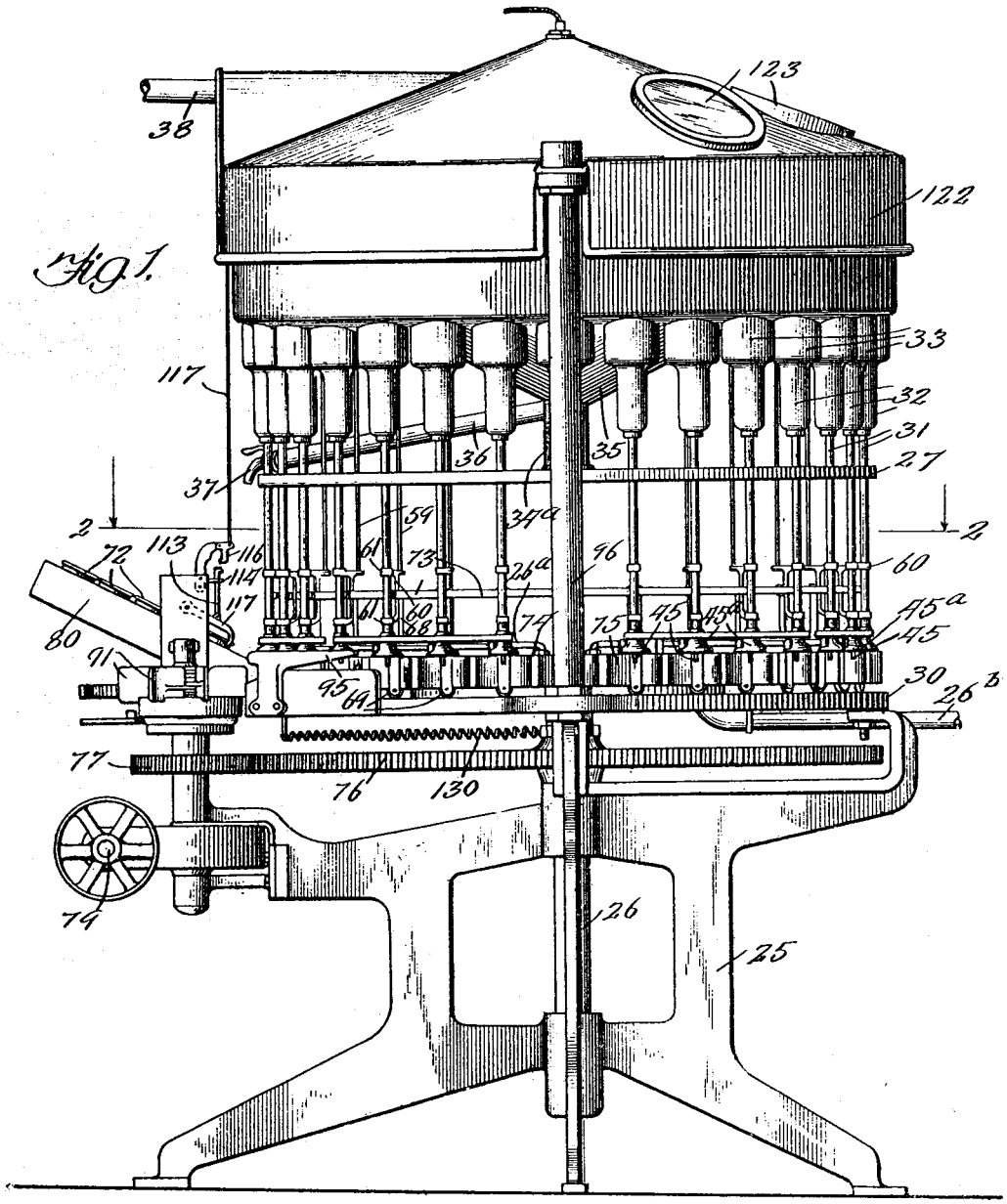

F. G. DICKERSON.
CAN FILLING MACHINE.
APPLICATION FILED APR. 20, 1911.

1,117,346.

Patented Nov. 17, 1914.
10 SHEETS—SHEET 3.

Witnesses:

Inventor:
Fred G. Dickerson
By Brown & Hopkins
Attys.

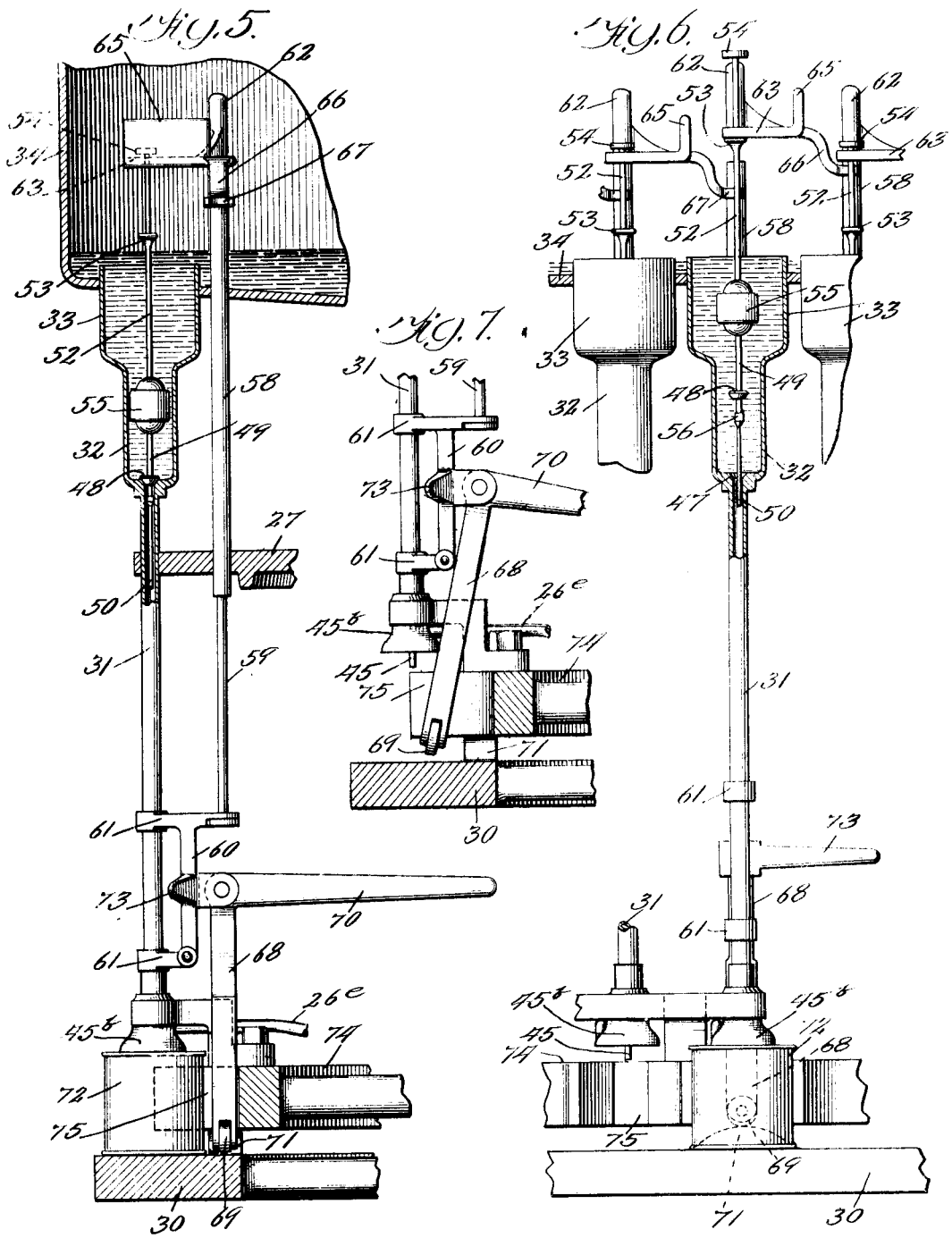

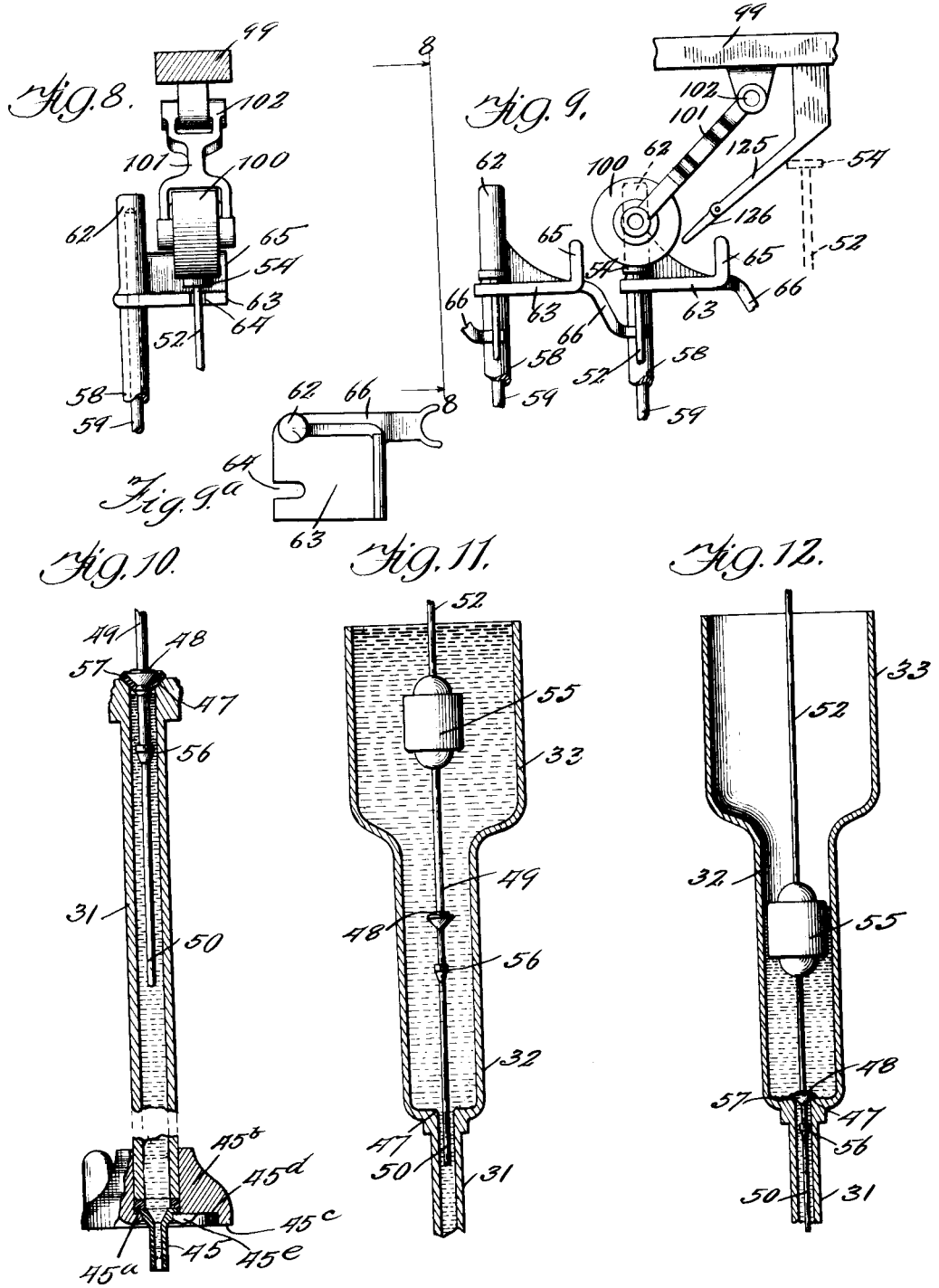

F. G. DICKERSON.
CAN FILLING MACHINE.
APPLICATION FILED APR. 20, 1911.
1,117,346.
Patented Nov. 17, 1914.
10 SHEETS—SHEET 6.
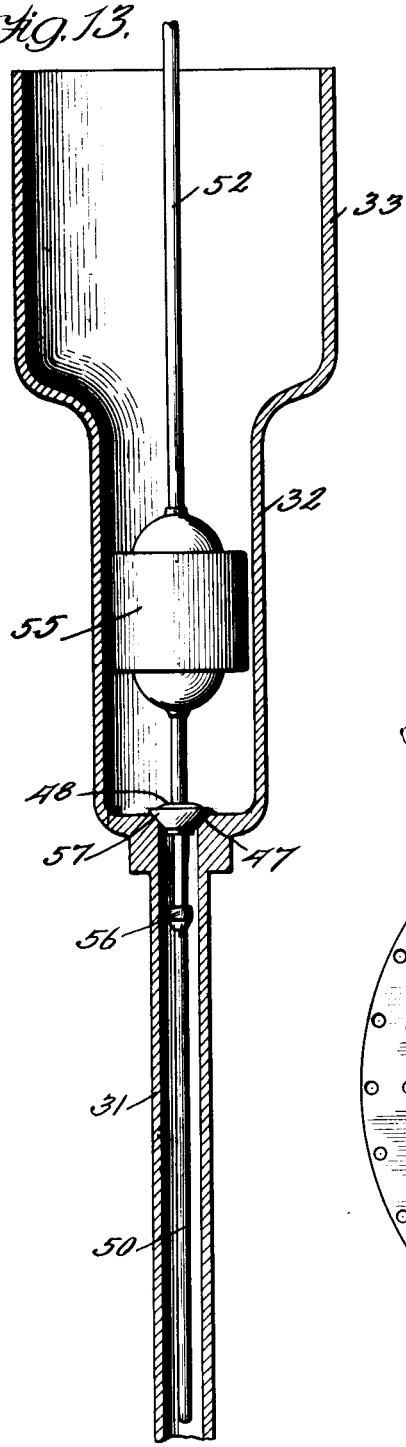
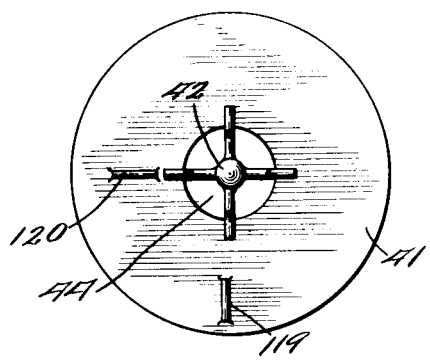
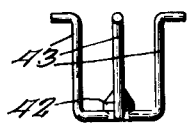
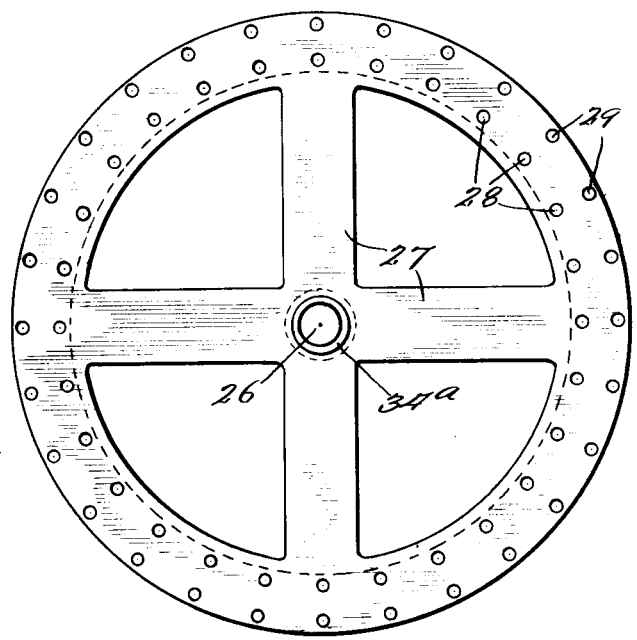

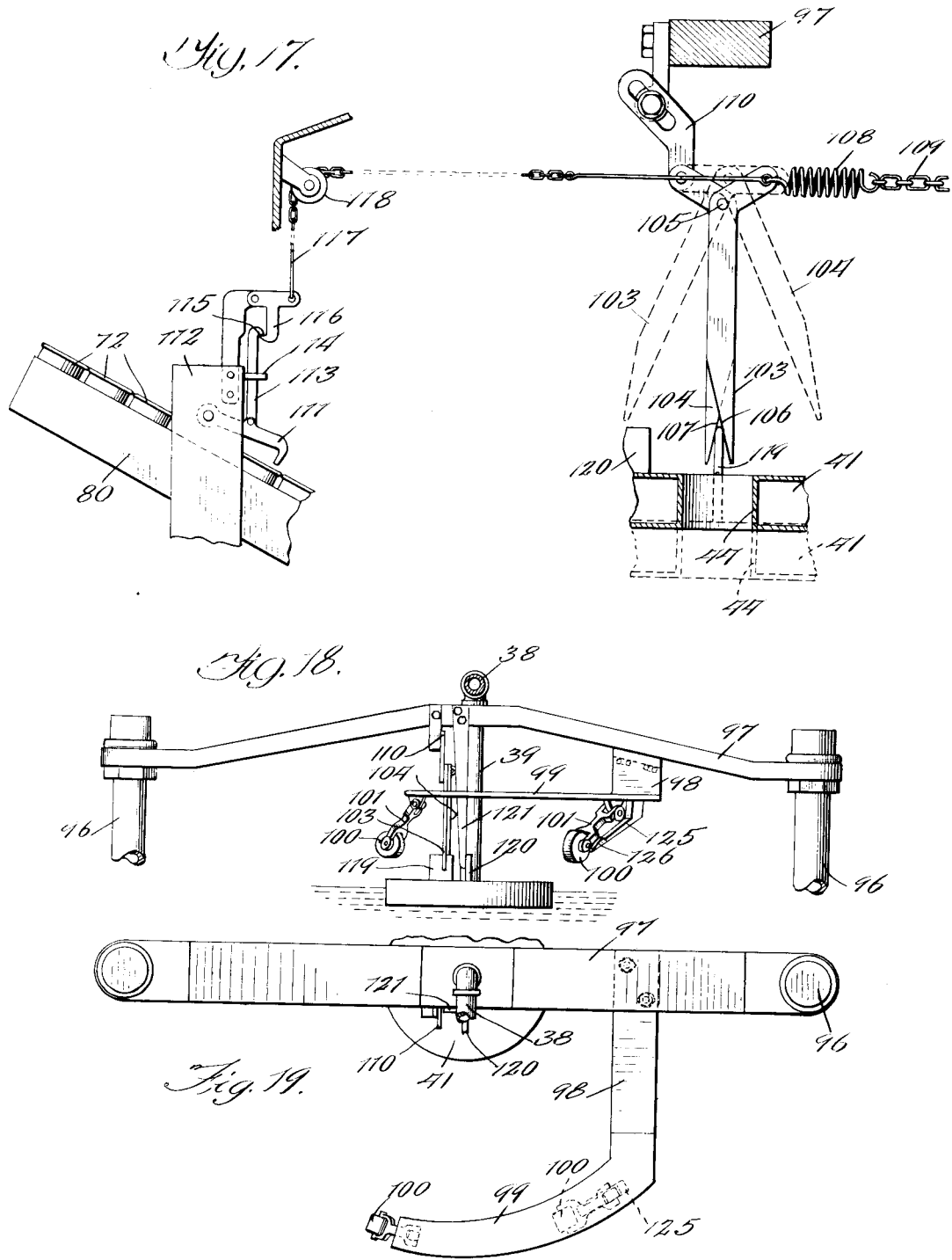

F. G. DICKERSON.
CAN FILLING MACHINE.
APPLICATION FILED APR. 20, 1911.
1,117,346.
Patented Nov. 17, 1914.
10 SHEETS—SHEET 8.
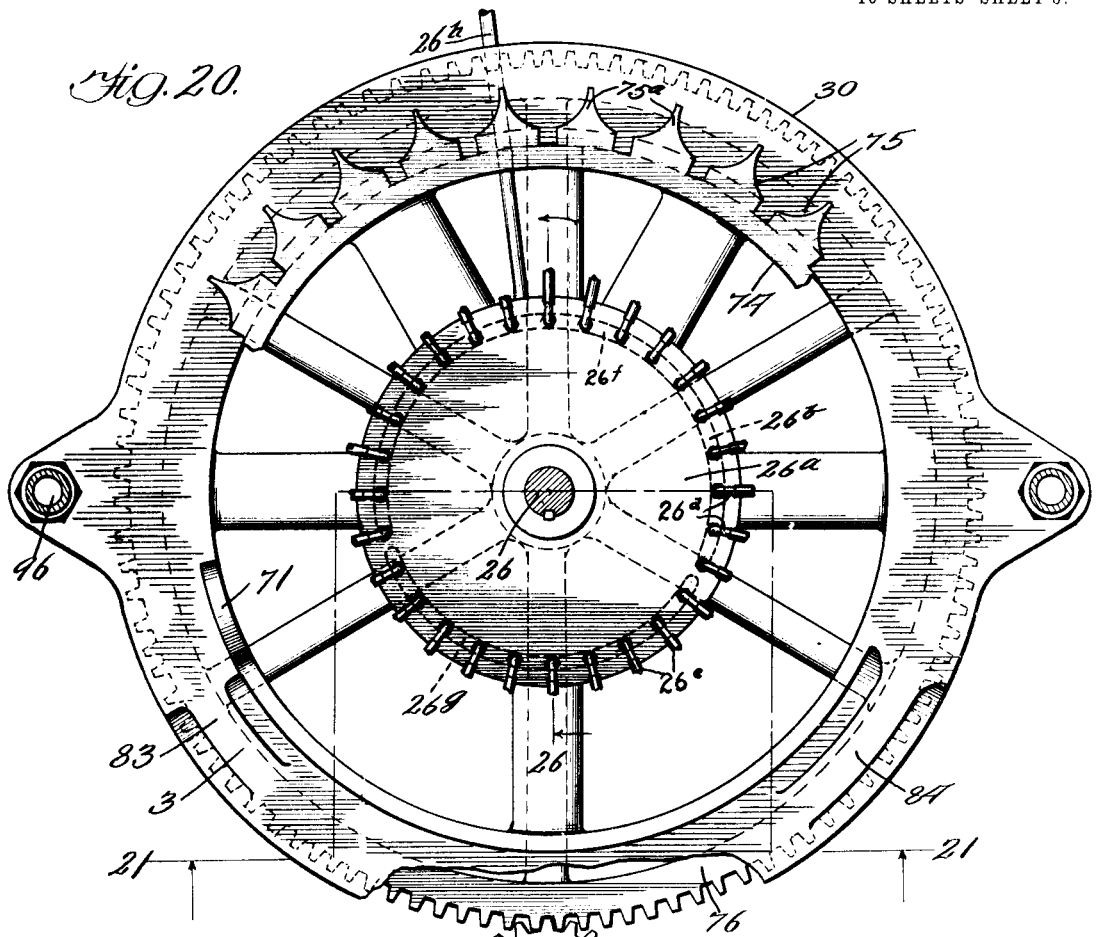
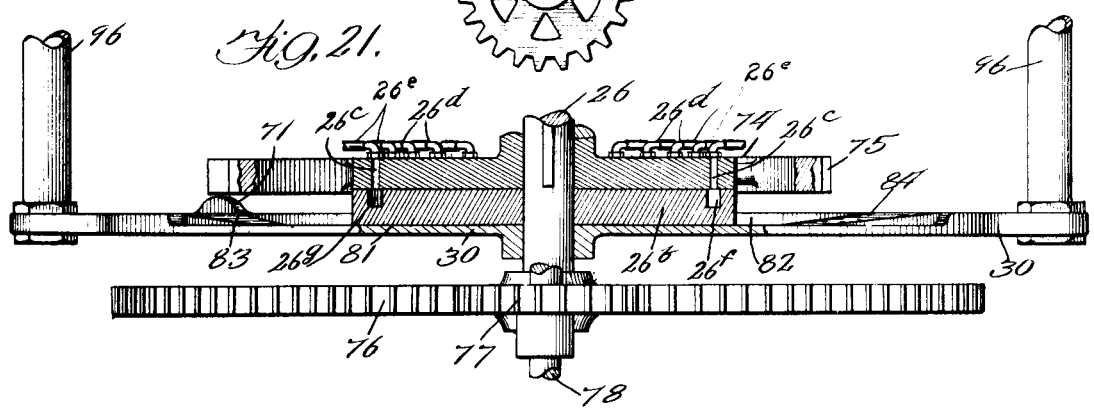
Witnesses:
Inventor:
Fred G. Dickerson
By Brown & Hopkins
Attys.

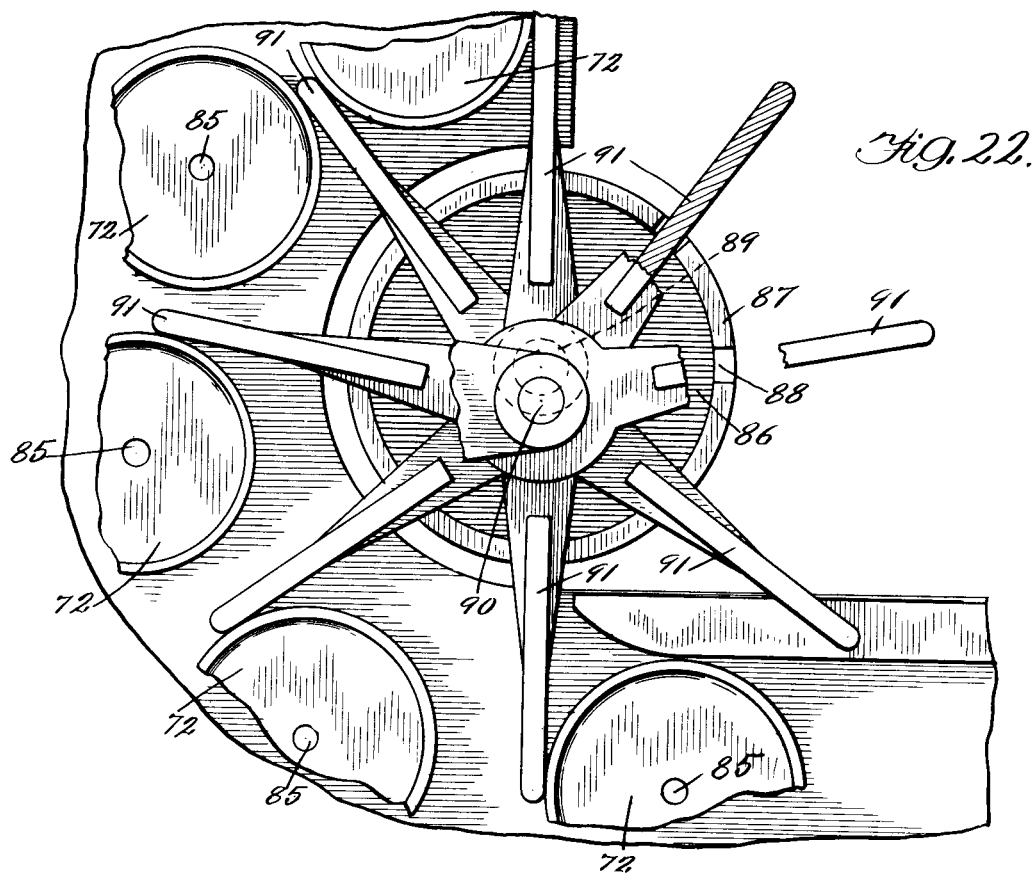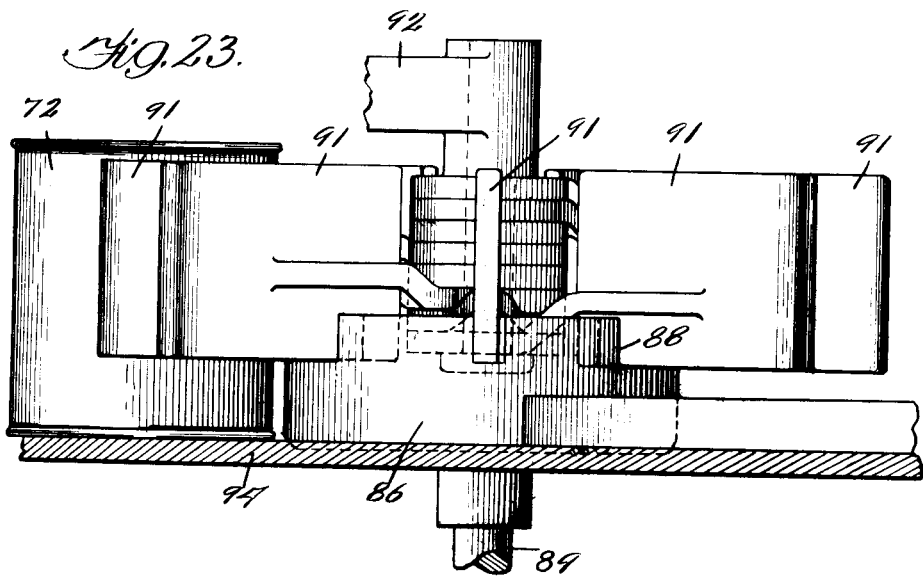

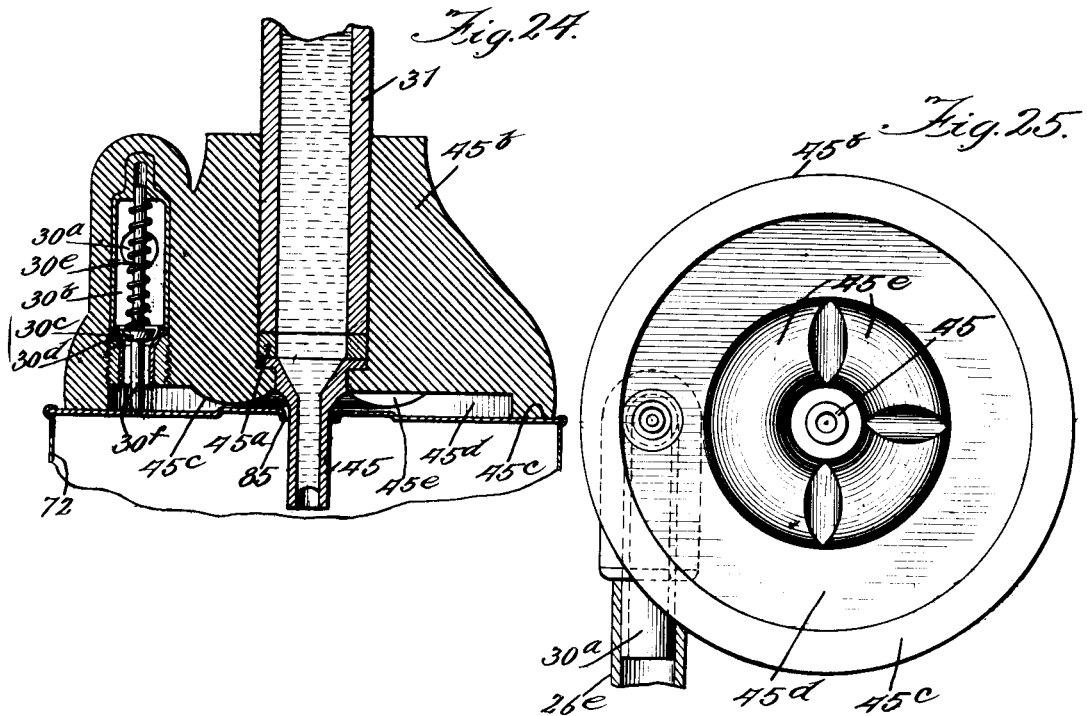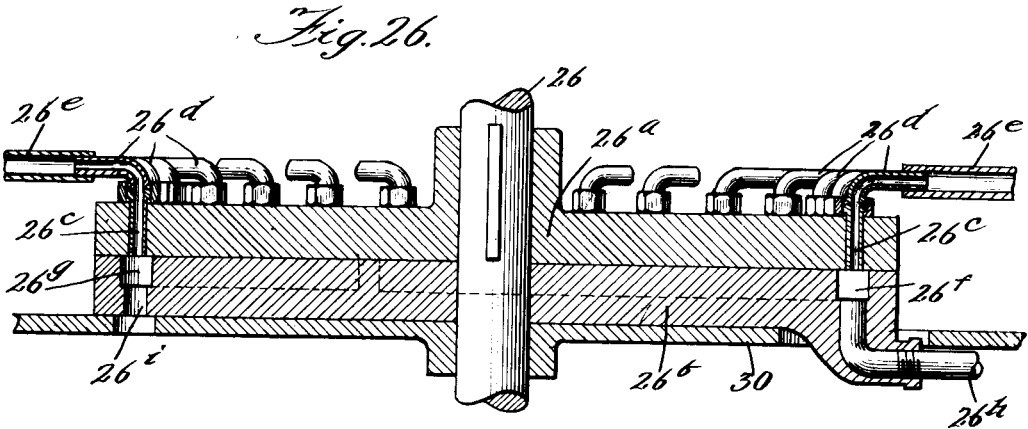

UNITED STATES PATENT OFFICE.

FRED G. DICKERSON, OF CHICAGO, ILLINOIS.

CAN-FILLING MACHINE.

1,117,346.    Specification of Letters Patent.    Patented Nov. 17, 1914.

Application filed April 20, 1911. Serial No. 622,180.

*To all whom it may concern:*

Be it known that I, FRED G. DICKERSON, a citizen of the United States, residing at Chicago, in the county of Cook and State of Illinois, have invented certain new and useful Improvements in Can-Filling Machines, of which the following is a specification.

This invention relates to improvements in can filling machines, and more particularly to machines adapted to automatically fill cans and the like with liquids, such as milk or other similar fluids, and one of the objects of the invention is to provide an improved machine of this character having means whereby the cans may be filled through an aperture or opening of the minimum size through the top.

A further object is to provide an improved machine of this character having means whereby the air may be extracted from the can or vessel so that the liquid may be caused to flow quickly and readily thereinto and without producing foam in the can or receptacle.

A further object is to provide an improved filling nozzle or mechanism which is adapted to be automatically inserted into the cans and opened to discharge the liquid, and closed and withdrawn after the can is filled, and also having means whereby the nozzle will readily adjust itself to any irregularity of the can and will yield to prevent injury should the can be presented in an improper position.

A further object is to provide an improved machine of this character having means for automatically cleaning the nozzle as it is withdrawn from the can to prevent liquid from dropping from the nozzle on to a can when the nozzle is withdrawn, which dropping of the liquid would interfere with the soldering or closing of the filling opening or vent in the can.

A further object is to provide an improved valve controlled nozzle, and improved means for positively seating the valve.

A further object is to provide an improved machine of this character having positive means for imparting an initial movement to the valve after the nozzle is inserted into the can, and also means whereby the valve will be controlled by the liquid in the nozzle after such initial movement has been imparted thereto.

A further object is to provide an improved machine of this character having means whereby the supply of cans to the machine may be automatically controlled by the height of the liquid in the machine.

A further object is to provide an improved machine of this character which will be simple, durable and cheap in construction and effective and efficient in operation, and in which the parts may be readily removed, and may as readily be cleaned.

To the attainment of these ends and the accomplishment of other new and useful objects, as will appear, the invention consists in the features of novelty hereinafter more fully described and claimed, and shown in the accompanying drawings illustrating an embodiment of the invention, and in which—

Figure 2:
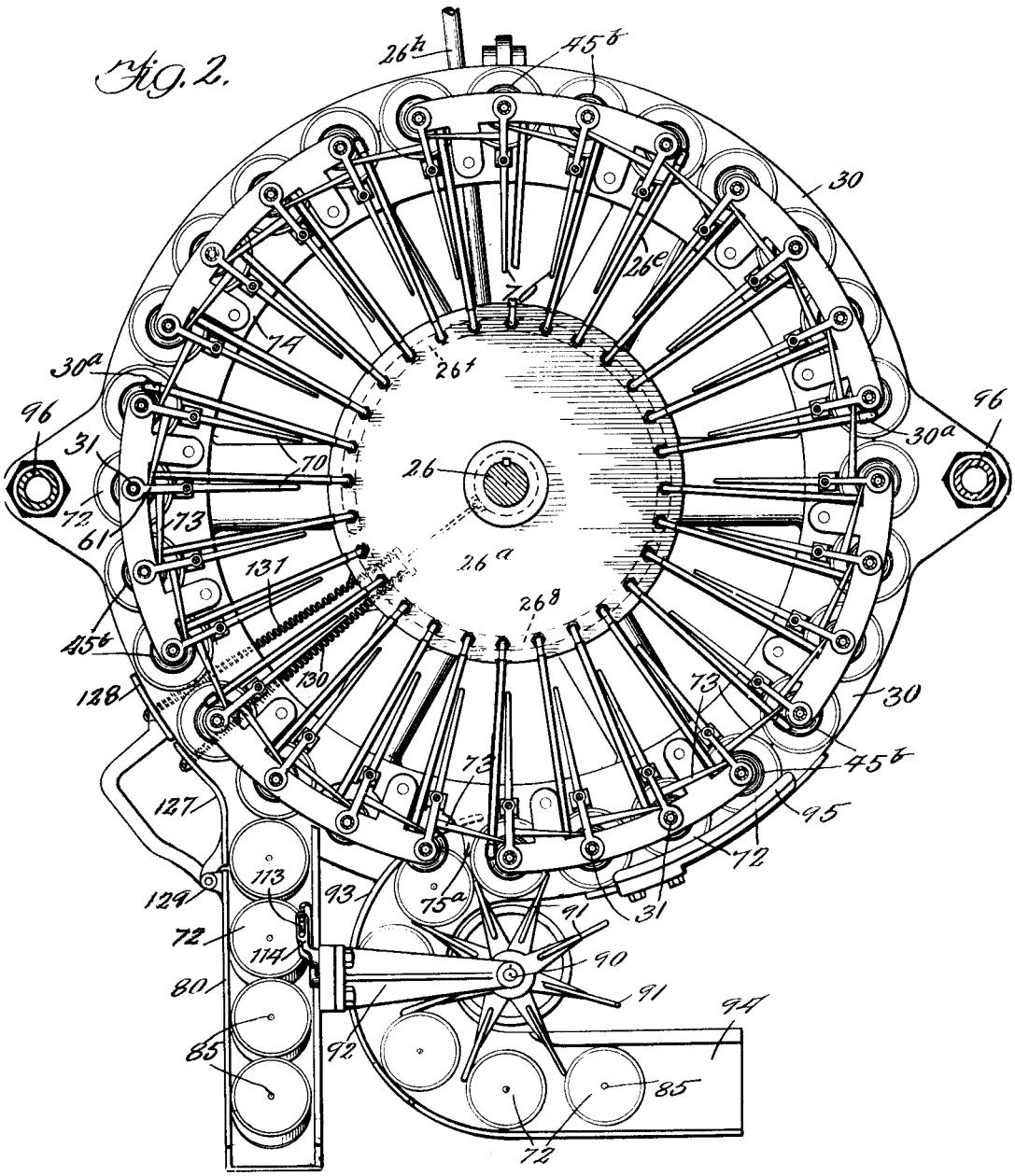
Figure 3:
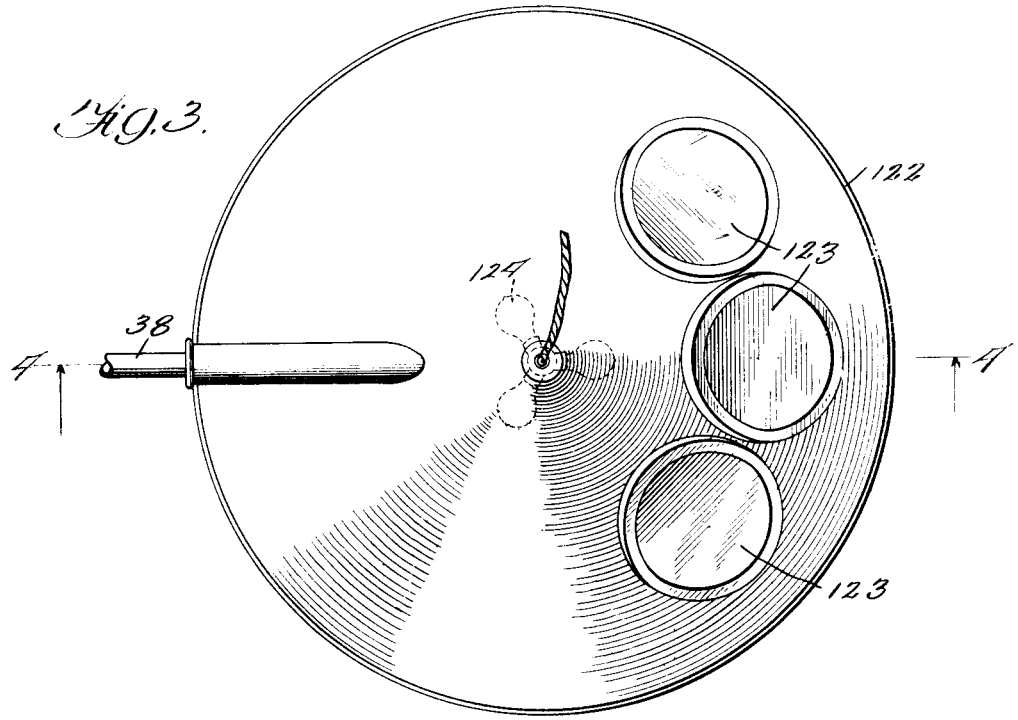
Figure 4:
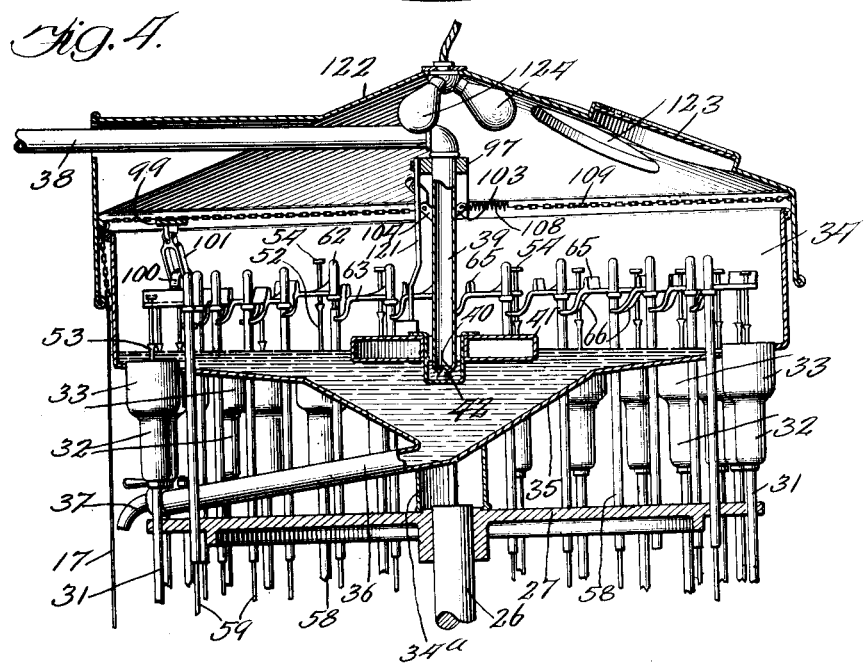

Figure 1 is a front elevation of an improved machine of this character constructed in accordance with the principles of this invention. Fig. 2 is a sectional view on line 2—2, Fig. 1. Fig. 3 is a top plan view of Fig. 1. Fig. 4 is a detail sectional view on line 4—4, Fig. 3. Fig. 5 is an enlarged detail view partly in elevation and partly in section, showing one of the filling tubes. Fig. 6 is a front elevation of a plurality of the filling tubes and nozzles partly in section, and with parts removed, showing the portion of the mechanism for positively seating the valves. Fig. 7 is a detail view partly in elevation and partly in section, of the controlling mechanism for operating the valves when the can is present under the filling nozzle, and for preventing the valve from being opened when the can is absent. Fig. 8 is a detail view partly in section and partly in elevation, taken on the line 8—8, Fig. 9, showing the seating mechanism for the valve. Fig. 9 is a side elevation of Fig. 8. Fig. 9ª is a top plan view of one of the cap members. Fig. 10 is an enlarged detail section view of one of the filling tubes and nozzles, showing the valve seated, and with the tube filled with liquid also illustrating the position of the liquid within the tube after the tube has been cleaned by positively seating the valve. Fig. 11 is an enlarged detail sectional view of a portion of one of the filling tubes showing the position of the parts during the filling of a can. Fig. 12 is a view similar to Fig. 11 showing the valve seated. Fig. 13 is an enlarged detail sectional view similar to Figs. 11 and 12, showing the valve seated and with the filling tube emptied. Fig. 14 is a top plan view of the float for controlling the supply of liquid to the machine. Fig. 15 is a side elevation of the valve carried by the float. Fig. 16 is a plan view of the reinforcing and supporting ring for parts of the machine. Fig. 17 is a view partly in elevation and partly in section of the float holding mechanism and the mechanism whereby the supply of cans will be controlled by the float. Fig. 18 is a detail side elevation partly in section showing the float and the mechanism controlled thereby, and also the positive seating means for the valves. Fig. 19 is a top plan view of Fig. 18. Fig. 20 is a plan view partly in section and partly broken away of the mechanism for advancing the cans. Fig. 21 is a detail sectional view on line 21—21, Fig. 20. Fig. 22 is a detail plan view of the can ejecting mechanism. Fig. 23 is a side elevation partly in section of Fig. 22. Fig. 24 is an enlarged detail sectional view of the discharge end of one of the nozzles showing a portion of a can in section. Fig. 25 is a bottom view of the nozzle shown in Fig. 24. Fig. 26 is a sectional view on line 26—26, Fig. 20.

Referring more particularly to the drawings, and in the present exemplification of the invention, the numeral 25 designates a support upon which the machine is mounted, and this support is provided with journals in which is mounted an upright shaft 26, to which is secured at any desired or suitable height above the bed of the support a frame 27 (see Figs. 4 and 16), and this frame 27 is provided with a plurality of series of apertures or openings 28, 29, therethrough for a purpose to be set forth. Mounted upon the support 25 is a bed plate 30, which is preferably of annular construction, and is secured to the support in any suitable manner to prevent rotation thereof. A plurality of filling tubes 31 are provided, the receiving end of which is enlarged, as at 32, and the extremity of this receiving end is still further enlarged, as at 33. These extremities 33 have communication with a tank 34 through the bottom of the tank, and to which bottom the ends of the tubes are secured. The portions 31 of the filling tubes pass loosely through the apertures 29 in the frame 27, and the tubes are supported and held in position by means of the tank 34, which latter is itself supported and held in position by means of a support 34ª (see Figs. 1 and 4), which support rests upon the frame 27. The tank 34 may be of any desired size and configuration, and the bottom thereof inclined from the periphery toward a depressed portion (see Fig. 4) located substantially at the diametric center of the tank, and leading from this depressed portion 35 is an outlet pipe or tube 36, which is controlled by a stop cock 37. This depressed portion 35 and the outlet pipe 36 are provided as means whereby the liquid in the tank may be removed when desired.

The tank 34 is arranged in an inclined position with respect to the horizontal, so that some of the enlarged extremities 33 of the tubular member 31 will be above the level of the liquid, while the tops of the others of the enlarged portions 33 will be submerged. The object in thus inclining the tank is to insure that the tubular members 31 which are in the act of filling the cans will always be supplied with a proper amount of liquid, and the tank is so inclined that the depressed portion thereof will be opposite the portion where the cans are being filled.

The liquid is supplied to the tank 34 through a supply pipe or tube 38, the end 39 of which (see Fig. 4) is preferably arranged in an upright plane, and its extremity 40 is shaped to form a valve seat. A float 41 is provided within the tank and a valve 42 is supported preferably by means of a suitable catch 43 (see Figs. 14 and 15), so that the valve 42 will be supported below an aperture or opening 44 in the float and through which aperture the extremity of the end 39 of the supply pipe projects. As the supply of liquid in the tank decreases, the float 41 will be lowered, and the valve 42 moved away from the valve seat 40 to permit liquid to enter the tank. When the proper amount of liquid is within the tank, the float 41 will rise and the valve 42 will be seated upon the valve seat 40 to shut off the supply.

The free or lower ends of the tubular members 31 terminate in nozzles 45 which latter are preferably separate from the member and are arranged adjacent the lower extremity of the member 31 with a cushion 45ª preferably in the form of an elastic gasket, interposed between the extremity of the member and nozzle. These parts are secured to the tubular member in any desired or suitable manner preferably by means of a cap member 45ᵇ constructed of elastic material such as rubber or the like. The nozzle 45 protrudes beyond the face 45ᶜ of the cap member 45ᵇ and the latter is provided with a recess 45ᵈ opening through the face 45ᶜ and surrounding the nozzle 45. The recess 45ᵈ is of any desired size but preferably of a diameter considerably larger than the opening 85 in the top of the can 72.

A valve seat 47 (see particularly Figs. 10, 11 and 12) is formed preferably at the junction of the tubular member 31 and the enlarged portion 32, and a valve 48 is provided which coöperates with the valve seat 47 to shut off the discharge of the liquid through the nozzle 45. As the construction and operation of each of these tubular members 31 and coöperating parts is the same, a description of one will apply equally as well to them all. The valve 48 is secured to a stem 49 which extends on both sides of the valve and one end 50 thereof projects into and moves within the tubular member 31. The other end 52 extends beyond the extremity of the enlarged portion 33 and projects into the tank 34 for some distance above the bottom thereof, and spaced shoulders 53, 54 are provided on the extremity of this end 52. A float 55 is supported by the stem 49 to move in the portions 32, 33 of the filling tubes. This float is such that it tends normally to move the valve 48 off of the seat 47 when the filling tubes are full of liquid. The extremity 50 of the stem 49 terminates short of the nozzle 45, and a guide 56 may be provided on the stem adjacent the valve 48 for guiding the valve to its seat. An elastic member or cushion 57 is provided, which surrounds the stem and the valve 48 so as to contact with the seat 47. When the float 55 is lowered from the position shown in Fig. 11 to that shown in Fig. 12, the supply of liquid to the tubular portions 31 will be shut off by means of the elastic member or cushion 57 contacting with the valve seat 47. After the liquid is thus shut off, the valve 48 may be further seated or forced against its seat in a manner and for a purpose to be hereinafter set forth, and the elastic member 57 will yield to permit this further seating of the valve.

Supported by the bottom of the tank adjacent each of the filling tubes is a tubular member 58 (see particularly Fig. 5) one end of which projects through the bottom of the tank 34, and extends to a point above the liquid level. The tube is supported by means of the tank and for this purpose it is secured to the tank in any suitable manner. The free extremity of the tube 58 projects through one of the apertures 28 adjacent each of the filling tubes. Slidably mounted within the tube 58 and projecting below the lower extremity thereof is a rod 59, one extremity of which is secured to a yoke 60 having arms 61 which loosely surround the lower portion of the filling tube. The other extremity of the rod 59 (see particularly Fig. 8) projects above the top of the tubular member 58 and into a tubular portion 62 of a cap member, which is provided with a laterally extending portion 63 having a bifurcation 64 therein. This bifurcation 64 is adapted to receive the extremity of the end 52 of the stem 49, so that the shoulders 53, 54, thereon will stand one above and the other below the laterally projecting portion 63. This portion 63 is provided with an upwardly projecting shoulder or extension 65 for a purpose to be hereinafter set forth, and projecting from this cap member is an arm 66 provided with a bifurcated extremity 67 adapted to stand astride of the next adjacent tube 58 and serves as a means for preventing the rotation of the cap member on the extremity of the rod 59.

The yoke 60 is adapted to move upwardly and downwardly on the filling tube and during the upward movement of the yoke the cap member is moved by the rod 59 so as to bring the laterally projecting portion 63 into engagement with the uppermost shoulder 54 on the stem 49 and thereby shift the stem longitudinally to impart an initial unseating movement to the valve 48 when the filling tube is full of liquid. After this initial movement has been imparted to the valve and the valve is partially unseated, the float 55 will cause the valve to be quickly unseated and the float will continue to rise in the filling tube until the shoulder 53 strikes the laterally projecting portion 63 of the cap member. When the shoulder 53 engages this member 63, the movement of the float 55 and the valve 48 will be arrested. Any suitable means may be provided for thus unseating the valve 48. A suitable and efficient means for accomplishing this result will now be described. The mechanism particularly adapted for this purpose is controlled by the can, and it will be apparent that when the can is present under the nozzle 45, the valve should be unseated to permit the can to be filled, but in the event that a can is not present under the nozzle, it is of course desirable that the valve shall not be unseated, to prevent waste of the liquid. In order, therefore, to accomplish this result, there is pivotally supported by the yoke a swinging member 68 preferably adapted to swing transversely with respect to the nozzle. An anti-friction roller 69 (see particularly Figs. 5 and 7) is provided on the end of the member 68, and this member 68 is so located and is of such a length that the anti-friction roller 69 will engage and move upon the bed plate 30. This member 68 is provided with a laterally projecting weighted arm 70, so disposed that it normally tends to swing the member 68 about its pivot to move the anti-friction roller 69 transversely of the bed plate. Arranged upon the bed plate 30 at a suitable point is a cam or raised portion 71 (see Figs. 5, 6, 7, 20 and 21). This cam is located in the path of movement of the anti-friction roller 69 when a can 72 is present under the nozzle 45, and the arm 70 is of such a weight that when a can 72 is present under the nozzle 45, it will not eject the can, but when a can is not present, it will swing the member 68 from the position shown in Fig. 5 to that shown in Fig. 7. As the can is advanced and the members 31 travel in a manner to be set forth, the member 68 will travel with the filling tubes so that the anti-friction roller will engage and move over the cam 71 when the can 72 is present. As the can advances and the roller 69 moves over the cam, the member 68 will be raised, and as this member 68 is secured to the yoke 60, and the rod 59 is secured to the yoke, the latter will be raised and this in turn will elevate the cap member so that the portion 63 thereof will engage the shoulder 55 on the extremity 52 of the stem 49 to unseat the valve 48.

In order to prevent the yoke 60 from swinging about the filling tube as an axis, the yoke is provided with a rigid arm 73 which projects for some distance beyond the yoke so as to extend into the space between the next adjacent filling tube and the yoke thereon.

The cans 72 are advanced on the bed plate 30 in any suitable manner, preferably by means of a rotary member 74 which is provided with seats or recesses 75 in its periphery to receive the cans, and this member 74 is secured to the shaft 26 for rotation therewith. Motion is imparted to the shaft preferably by means of a gear wheel 76 secured thereto, and which meshes with the gear wheel 77 secured to a shaft 78, which shaft 78 receives its motion from a drive shaft 79, to which it is connected in any suitable manner. Thus it will be seen that when the shaft 26 is rotated the frame 27 which is secured thereto will likewise be rotated, and as the tank 34 is supported by the frame and is connected therewith for rotation therewith through the medium of the filling tubes and the tubes 58 pass respectively through the apertures 29 28 therein, the tank and filling tubes will be rotated in unison with the advancement of the cans.

The cans are supplied to the machine in any suitable manner, preferably by means of a run-way or chute 80 arranged in an incline with respect to the bed of the machine and this chute is arranged to discharge the cans on end upon the portion 81 of the bed plate 30 (see Fig. 21). This portion of the bed plate is lower than the remaining portion 82 of the plate, and communicates with the high portion of the plate by means of the inclined portions 83, 84. The object in providing this low portion of the bed plate 30 is to permit the cans 72 which are provided with a small aperture 85 in the top thereof, and through which the cans are filled, to be positioned in the pockets 75 of the advancing member 74, while on the low portion of the bed plate. After being thus positioned, and as the cans are advanced, they are moved up the inclined portion 83 on to the high portion 82 of the bed plate. This movement of the can will be effected as it approaches the filling nozzle 45, thereby causing the aperture 85 to be properly positioned, and when so positioned, the can will be elevated so that the nozzle 45 will project through the aperture 85. The elastic cushion or gasket 45ª between the tubular member 31 and the nozzle 45 will yield should the nozzle strike the can top and will also permit the nozzle to yield to any irregularity in centering or projecting the nozzle into the filling opening. After the can has been thus positioned and the mechanism advanced, the anti-friction roller 69 on the member 68 will be moved into engagement with the cam 71 and this will unseat the valve 48 in the manner as already set forth. After the anti-friction roller 69 has passed over the cam 71, the yoke 60 will be moved downwardly on the filling tube, so that the roller 69 will move into engagement with the high portion of the bed plate. The cap member on the end of the rod 59 will also be lowered and the valve 48 will be maintained and held in an open position by the float 55. After sufficient liquid has been discharged into the can to fill it, the valve 48 will be seated by the lowering of the float, which is effected by the lowering of the liquid in the filling tube. This operation is also effected by means of the fact that when the valve is unseated to permit the liquid in the filling tube to pass into the can, the upper extremity of the enlarged portion 33 of the filling tube will have passed above the liquid level of the tank 34 and for this reason and in order to produce this result, the tank 34 is arranged in an inclined position with respect to the horizontal. Each of the filling tubes is of such a size as to hold just sufficient liquid to fill a can and also sufficient liquid to maintain a column of liquid in the filling tube between the upper portion of float 55 and the nozzle 45 after the valve is closed, as shown more clearly in Fig. 12. This column of liquid in the filling tube acts upon the valve 48 and assists in holding the valve closed.

In order to extract the air from the cans or vessels so that the liquid will flow freely thereinto to fill them, the cap 45ᵇ is provided which rests upon the top of the can when the nozzle 45 is inserted thereinto. When in position the recess 45ᵈ will have communication with the interior of the cam through the opening 85 in the top. Suitable exhaust mechanism embodying an exhaust pipe 30ª has communication with the recess 45ᵈ through a valve chamber 30ᵇ in the cap 45ᵇ and which valve chamber has direct communication with the recess 45ᵈ. A spring controlled valve 30ᶜ is provided in the chamber 30ᵇ and coöperates with a valve seat 30ᵈ for cutting off communication with the recess 45ᵈ. The spring 30ᵉ which seats the valve is of sufficient tension to normally seat the valve against the suction in the pipe 30ª and holds the valve on its seat whenever a can is not present under the nozzle. A stem 30ᶠ projects from the valve and extends into the recess 45$^d$ and is of a length to project beyond the face 45$^c$ of the cap 45$^b$ when the valve 30$^c$ is seated, so that when the face 45$^c$ of the cap and the can top are brought into engagement, the end of the stem 30$^f$ will also engage the can top and the valve 30$^c$ will be unseated. When thus unseated, suction in the pipe 30$^e$ will draw the air out of the can through the opening 85, recess 45$^d$ and valve chamber 30$^c$. When the cap 45$^b$ and can are moved out of engagement with each other the valve 30$^c$ will be seated.

Projections 45$^e$ may be provided on the bottom wall of the recess 45$^d$ and preferably around the nozzle 45 so as to form a barrier for the air to cause it to circulate in the recess while at the same time they will serve to re-inforce the cap at that point. There is provided one of these caps 45$^b$ and controlling valve 30$^c$ for each of the filling tubes 31 and a common controlling mechanism or governor more clearly illustrated in Figs. 21 and 26 is provided. This controller preferably comprises two coöperating members 26$^a$, 26$^b$, which are preferably arranged adjacent the member 30 and surround the shaft 26, the member 26$^a$ being secured to the shaft for rotation therewith, while the member 26$^b$ is stationary with respect to the shaft and the member 26$^a$. The member 26$^a$ is provided with a plurality of passages 26$^c$ passing therethrough, one for each of the tubes 31, and tubular extensions 26$^d$ lead from these passages 26$^c$. A tubular flexible member 26$^e$ leads from each of the extensions 26$^d$ and has communication with one of the pipes 30$^a$ leading from the valve chamber 30$^b$ in the cap 45$^b$.

The member 26$^b$ is provided with two grooves or chambers 26$^f$, 26$^g$ opening through the face thereof adjacent the member 26$^a$ and in such positions that when the member 26$^a$ is rotated the passages 26$^c$ will be successively into communication with these grooves. These grooves are independent of each other and the groove 26$^f$ is somewhat longer than the other groove and is so disposed with respect to the high portion of the member 30 that when the nozzles 45 are inserted into the cans, the passages 26$^c$ which communicate with the chambers 45$^d$ of the caps 45$^b$ of the nozzles which are in the cans, will be in communication with the groove 26$^f$. This groove being in communication with an exhaust or suction device through the medium of the pipe 26$^h$, it will be apparent that the air will be exhausted from the cans that are being filled with liquid. The groove or channel 26$^g$ has communication with the atmosphere through an opening 26$^i$ and is so arranged with respect to the low portion of the member 30, that when the cans are moved thereon, and the nozzles are withdrawn from the cans, the passages 26$^c$ which have communication with cans from which the nozzles have been withdrawn, will pass into communication with the groove or channel 26$^g$ to release the suction, as will be understood. Obviously any form of connection suitable for the purpose may be provided between the suction controller and the various chambers 30$^b$.

The cans are filled while they are being advanced or moved by the member 74 over the high portion of the bed plate 30, and by the time they reach the inclined portion 84 the valve 48 will be closed, and as the can descends the inclined portion 84, it will be moved away from the nozzle 45, causing the latter to be withdrawn from the can. It will thus be seen that the cans may be filled through an opening of the minimum size, which is advantageous in the sealing operation, inasmuch as it necessitates only a small drop of solder to close the filling opening 85.

After the cans pass down the inclined portion 84, they will be ejected from the machine by means of an ejector which preferably comprises a rotatable member 86 having an annular flange 87 projecting upwardly therefrom and in which flange a plurality of spaced lateral openings 88 are provided. This member 86 is secured for rotation with the shaft 89 and arranged eccentrically upon and projecting beyond the member 86 is a shaft 90 upon which is loosely mounted a plurality of lateral arms or blades 91. The shaft 90 may be braced in any suitable manner, preferably by means of a bracket 92, and the edges of these arms or blades 91 rest in the apertures or recesses 88. A guide 93 (see Fig. 2) is provided which communicates with a run-way 94, and one end of the guide projects into the path of movement of the cans 72 so that the cans will be directed into the run-way 94. The arms or blades 91 are so arranged that the extremities thereof will pass successively between the advancing cans, and by mounting the arms or blades eccentrically with respect to the member 86, the rotation of the member 86 will cause the arms or blades to be adjusted with respect to each other, so that as they are rotated, they will be gradually separated or moved to a greater distance from each other as the cans pass into the run-way 94. The object in thus spacing the cans is to provide means whereby the cans may be properly positioned with respect to each other so that they will be uniformly spaced farther apart as they pass into the soldering machine.

In order to force the cans 72 down the incline 84 so that the cans may be "stripped", so to speak, from the nozzles 45, there is provided a flange 95 (see Figs. 1 and 2) under which the cans are adapted to pass when they reach the incline 84.

In order to prevent the liquid from dropping from the nozzle 45 when the valve 48 is closed, or to clean the nozzle after it has filled a can and to prevent a drop of liquid adhering to the nozzle, suitable mechanism is provided for removing this drop of liquid which would ordinarily form or accumulate on the end of the nozzle. This may be accomplished by giving the valve 48 a sudden blow or tap so as to force it upon its seat, and for this purpose the elastic member or cushion 57 (see Fig. 10) is provided. It will be apparent that unless some cushion is provided at this point, the valve would be seated to its full extent by the descent of the float 55, and therefore, the valve could not be operated in this manner to effect this result. In the present invention and by tapping the end of the stem 49 quickly by a heavy article, the cushion 57 will yield sufficiently to discharge this drop of liquid while at the same time the column of liquid in the tube 31 between the valve 48 and the nozzle 45 will be maintained, and the suction created by this column of liquid will still act upon the valve to hold it seated. After the drop of liquid has been discharged from the nozzle 45, the liquid will assume the position within the tube as shown in Fig. 24. This tapping of the valve for discharging the drop of liquid takes place just before the nozzle moves out of the fill opening in the can. Suitable mechanism for accomplishing this result will now be described.

Supported in any suitable manner from the main support 25 are a pair of uprights 96 which extend for any desired distance above the bottom of the tank and preferably on the outside of the tank. A connecting bar or member 97 is secured to these uprights and extends across the top of the tank (see particularly Figs. 4, 18 and 19). This connecting bar 97 is preferably provided with an aperture through which the extremities 39 of the supply pipe 38 project, and this member 97 serves as a means whereby the extremity 39 of the pipe may be supported. An arm or bracket 98 is supported by this connecting bar or member 97 and is provided with a curved extremity 99 curving in the direction of movement of the filling tubes. The connecting bar or member 97 and the bracket 98 with the extremity 99 are stationary, and the extremity 99 is so arranged that the extremities of the portions 52 of the stems 49 will pass thereunder. A roller 100 of some weight is journaled in the extremity of a link 101, and the free extremity of this link is pivotally supported as at 102 from the extremity 99 of the bracket 98. Any number of these rollers may be provided, but in the present exemplification, two are shown, one arranged slightly in advance of the other. These rollers 100 are so located that as the filling tubes are advanced, the projecting or raised portions 65 of the cap members on the rods 59 will move into engagement with the rollers and raise the latter. The projections 65 on the cap members are so located with respect to the shoulder 54 on the end 52 of the stem 49 of the next adjacent filling tube that after the roller has been raised by the portion 65 and the respective filling tubes advanced, the roller will fall off of the raised portion on to the shoulder 54 with some force and will thereby impart a blow to the stem 49 and consequently to the valve 48. This action of the roller 100 takes place after the valve 48 has been seated by the lowering of the liquid level in the filling tubes. One of these rollers 100 is arranged so as to impart a blow to the valve 48 just before the filling nozzle is moved out of the fill opening in the can, and the other of the rollers 100 is provided in the event that a drop of liquid forms on the nozzle so as to insure a clean nozzle, and to prevent the drop of liquid from dropping on to the next can into which the nozzle is to project.

Any suitable means may be provided for automatically controlling the supply of cans. In the present exemplification of the invention it is designed to automatically control this supply by the liquid in the tank. In order, therefore, to accomplish this result, suitable mechanism controlled by the float 41 is provided, and will now be described.

Mounted upon any suitable support, preferably the bar or member 97, are a pair of cross arms 103, 104 (see particularly Figs. 17 and 18), which are pivotally connected as at 105. The extremities of the adjacent faces of one extremity of these arms are inclined or beveled, as at 106, 107. An elastic member 108 is provided, one end of which is secured to the opposite extremity of one of the arms, and is anchored by means of a suitable fastening device 109 to a suitable fixed support. These arms are pivotally supported by means of a hanger 110 adjustably mounted on the bar or member 97, and the elastic member 108 tends normally to separate the arms 103, 104 to move them from the position shown in full lines in Fig. 17 to that shown in dotted lines. A gate 111 is pivotally mounted upon a fixed support 112 and is adapted to be moved into and out of the path of movement of the cans 72 as they advance down the run-way 80. A link 113 is connected to the gate 111 and passes through a suitable guide 114. This link is provided with a shoulder 115 adapted to engage a pivoted catch 116. This catch 116 is connected in any suitable manner by means of a flexible connection, or otherwise, so as to be acted upon by the elastic member 108, and is preferably secured to the same extremity of the arm to which the elastic member is secured. This flexible member passes over a suitable pulley or guide-way 118.

The gate 111 is adapted to be held out of the path of movement of the cans by means of the catch 116 engaging the shoulder 115 so as to permit the cans to be fed, and when in this position, the elastic member 108 is located in such a manner that it will not exert its tension upon the flexible member 117 to move the catch 116 out of engagement with the shoulder 115. In order to accomplish this result, the float 41 is provided with a projection 119 which is adapted to pass between the inclined extremities 106, 107 of the arms 103, 104, when the float is raised by the liquid in the tank. In order to prevent the float from rotating, another projection 120 is provided thereon, which co-operates with the arm or projection 121 on the bar or member 97 when the projection 119 is between the arms 103, 104 and float is raised.

When the float is in the position shown in full lines in Fig. 17, and as shown in Fig. 18, the cans may be fed down the chute 80. As the float 41 descends by means of the lowering of the level of the liquid in the tank, the projection 119 will move from between the arms 103, 104 and the elastic member 108 will exert its tension to separate the arms and move them from the position shown in full lines in Fig. 17 to that shown in dotted lines. When the arms are thus adjusted, the catch 116 will be tripped through the medium of the flexible member 118 and the link 113 will be released. Thus released, the gate 111 will fall into the path of movement of the next advancing can and will check the supply.

A suitable cover 122 may be provided for the tank, and in this cover may be arranged suitable side openings 123. If desired, light bulbs 124 may also be provided, which are supported by the cover or closure, so that the operator may inspect the interior of the tank.

In starting the machine, and after it has been thoroughly washed, the filling tubes may be "primed", that is, they may be first filled with liquid before the machine is started into operation. This may be accomplished by placing one finger over the nozzle 45 and unseating the valve 48 by adjusting the stem 49 with the hand. When the filling tube is filled, the valve may be forced upon its seat by the hand, and the finger removed from the nozzle.

With this improved construction it will be apparent that all of the parts of the mechanism may be readily removed when desired, for cleaning. The cap members may be readily lifted from their seats, and the floats 55, valves 48 and stems 49 may be readily removed. The nozzles 45 may be removed, also, and after being removed, the entire tank and filling tubes may be bodily lifted from the machine as the tubes 31 slide freely through the apertures or openings 29 in the frame 27 and the tubes 58 slide freely through the apertures 28.

If for any reason one of the valves 48 on the float 55 is retarded and does not gravitate or settle so as to seat the valve 48 before the tube reaches the first roller 100, suitable mechanism is provided for forcing the valve to its seat so that the roller 100 will act properly thereon. This mechanism preferably comprises an incline or cam 125 (see Figs. 9 and 19), which is arranged within the path of movement of the projecting stem so as to be engaged by the head 54 of the stem and as the machine advances, the cam or incline will force the valve upon its seat. This incline or cam 125 is provided with a yielding extremity 126, so as to permit the valve to be moved the proper distance and also so as not to interfere with the advancing of the machine, and to permit the extension or projection 65 on the cap member to pass.

In order to force the cans 72 into the pockets 75 of the advancing member as the cans pass out of the runway or chute 80, a pair of pivoted members 127, 128 are provided, and are mounted for movement about a common pivot 129. These members 127, 128 are arranged concentric with the pockets and elastic members 130, 131 are provided which are secured respectively by one extremity to the members 127, 128 and are anchored by their other extremities to a fixed support. These elastic members tend normally to exert their tension upon the members 127, 128, so as to force the cans into the pockets and thereby properly position them with respect to the nozzles 45, and providing yielding means for allowing the cans to pass the wings 75ª of the members 74 without being injured thereby.

What is claimed as new is:

1. A filling apparatus embodying a filling tube having a source of supply of liquid, a valve within the tube and remote from the discharge end thereof, a float also within the tube and operatively connected with the valve for controlling the latter to control the discharge of liquid from the tube and for maintaining a column of liquid in the tube between the valve and the open discharge end of the tube, and means for assisting in unseating the valve.

2. A filling apparatus embodying a filling tube having a source of supply of liquid, a valve within the tube and remote from the discharge end thereof, a float also within the tube and operatively connected with the valve for controlling the latter to control the discharge of liquid from the tube and for maintaining a column of liquid in the tube between the valve and the open discharge end of the tube, and positive means for assisting in unseating said valve.

3. A filling apparatus embodying a filling tube having a source of supply of liquid, means remote from the delivery end of the tube for controlling the discharge of liquid from the tube and for maintaining a column of liquid in the tube between the said means and the open discharge end of the tube, and means for removing a portion of the liquid from the bottom of the column and through the discharge end of the tube while the column is maintained and the supply is shut off from the column.

4. A filling apparatus embodying a filling tube having a source of supply of liquid, means remote from the delivery end of the tube for controlling the discharge of liquid from the tube and for maintaining a column of liquid in the tube between the said means and the open discharge end of the tube, and means for automatically removing a portion of the liquid from the bottom of the column and through the discharge end of the tube while the column is maintained and the supply is shut off from the column.

5. A filling apparatus embodying a filling tube having a source of supply of liquid, means remote from the delivery end of the tube for controlling the discharge of liquid from the tube and for maintaining a column of liquid in the tube between the said means and the open discharge end of the tube, and means for imparting a sudden movement to the column of liquid to remove a portion of the liquid from the bottom of the column and through the discharge end of the tube while the column is maintained and the supply is shut off from the column.

6. A filling apparatus embodying a filling tube having a source of supply of liquid, means remote from the delivery end of the tube for controlling the discharge of liquid from the tube and for maintaining a column of liquid in the tube between the said means and the open discharge end of the tube, and positively actuated means for removing a portion of the liquid from the bottom of the column and through the discharge end of the tube while the column is maintained and the supply is shut off from the column.

7. A filling apparatus embodying a filling tube having a source of supply of liquid, means remote from the delivery end of the tube for controlling the discharge of liquid from the tube and for maintaining a column of liquid in the tube between the said means and the open discharge end of the tube, and mechanical means for automatically imparting a sudden movement to the column of liquid from one end thereof to remove a portion of the liquid from the other end of the column and through the discharge end of the tube while the column is maintained and the supply is shut off from the column.

8. A filling apparatus embodying a filling tube having a source of supply of liquid and an open discharge end, a valve seat within the tube and remote from the discharge end, a valve adapted to yieldingly engage the seat to control the discharge of liquid from the tube and for maintaining a column of liquid in the tube between the valve seat and the open end, and means for imparting a sudden movement to the valve while in engagement with its seat to discharge a portion of the liquid from the nozzle while the column is maintained and the supply shut off therefrom.

9. A filling apparatus embodying a filling tube having a source of supply of liquid and an open discharge end, a valve seat within the tube and remote from the discharge end, a valve adapted to yieldingly engage the seat to control the discharge of liquid from the tube and for maintaining a column of liquid in the tube between the valve seat and the open end, and automatically actuated means for imparting a sudden movement to the valve while in engagement with its seat to discharge a portion of the liquid from the nozzle while the column is maintained and the supply shut off therefrom.

10. A filling apparatus embodying a filling tube having a source of supply of liquid and an open discharge end, a valve seat within the tube and remote from the discharge end, a valve adapted to yieldingly engage the seat to control the discharge of liquid from the tube and for maintaining a column of liquid in the tube between the valve seat and the open end, and automatically actuated means for striking the valve while in engagement with its seat to remove a portion of the column of liquid from the discharge end of the tube while the column is maintained and the supply is shut off from the column.

11. A filling apparatus embodying a filling tube having a source of supply of liquid and an open discharge end, a valve seat in the tube remote from the discharge outlet, a valve coöperating with the seat for shutting off the supply of liquid to the tube and for maintaining a column of liquid in the tube between the valve and the open discharge end of the tube, yielding means disposed between the valve and its seat, a freely suspended weight, means for raising the weight and for permitting it to fall, and means operatively related to the valve and upon which the weight falls to force the valve on its seat against the tension of the said yielding means.

12. A filling apparatus embodying a filling tube having a source of supply of liquid and an open discharge end, a valve seat in the tube remote from the discharge outlet, a valve coöperating with the seat for shutting off the supply of liquid to the tube and for maintaining a column of liquid in the tube between the valve and the open discharge end of the tube, yielding means disposed between the valve and its seat, a freely suspended weight, means for raising the weight and for permitting it to fall, means operatively related to the valve and upon which the weight falls to force the valve on its seat against the tension of the said yielding means, and means for unseating the valve.

13. A filling apparatus embodying a filling tube having a source of supply of liquid and an open discharge end, a valve seat in the tube remote from the discharge outlet, a valve coöperating with the seat for shutting off the supply of liquid to the tube and for maintaining a column of liquid in the tube between the valve and the open discharge end of the tube, yielding means disposed between the valve and its seat, a freely suspended weight, means for raising the weight and for permitting it to fall, means operatively related to the valve and upon which the weight falls to force the valve on its seat against the tension of the said yielding means, and positive means for unseating the valve.

14. A filling apparatus embodying a filling tube having a source of supply of liquid and an open discharge end, a valve seat in the tube remote from the discharge outlet, a valve coöperating with the seat for shutting off the supply of liquid to the tube and for maintaining a column of liquid in the tube between the valve and the open discharge end of the tube, yielding means disposed between the valve and its seat, a freely suspended weight, means for raising the weight and for permitting it to fall, means operatively related to the valve and upon which the weight falls to force the valve on its seat against the tension of the said yielding means, and automatically actuated means for unseating the valve.

15. A filling apparatus embodying a filling tube having a source of supply of liquid and an open discharge end, a valve seat in the tube remote from the discharge outlet, a valve coöperating with the seat for shutting off the supply of liquid to the tube and for maintaining a column of liquid in the tube between the valve and the open discharge end of the tube, means controlled by the height of the liquid in the tube for controlling the seating of the valve, yielding means disposed between the valve and its seat, a freely suspended weight, means for raising the weight and for permitting it to fall, and means operatively related to the valve and upon which the weight falls to force the valve on its seat against the tension of the said yielding means.

16. A filling apparatus embodying a filling tube having a source of supply of liquid and an open discharge end, a valve seat in the tube remote from the discharge outlet, a valve coöperating with the seat for shutting off the supply of liquid to the tube and for maintaining a column of liquid in the tube between the valve and the open discharge end of the tube, means controlled by the height of the liquid in the tube for controlling the seating of the valve, yielding means disposed between the valve and its seat, a freely suspended weight, means for raising the weight and for permitting it to fall, means operatively related to the valve and upon which the weight falls to force the valve on its seat against the tension of the said yielding means, and means for unseating the valve.

17. A filling apparatus embodying a filling tube having a source of supply of liquid and an open discharge end, a valve seat in the tube remote from the discharge outlet, a valve coöperating with the seat for shutting off the supply of liquid to the tube and for maintaining a column of liquid in the tube between the valve and the open discharge end of the tube, means controlled by the height of the liquid in the tube for controlling the seating of the valve, yielding means disposed between the valve and its seat, a freely suspended weight, means for raising the weight and for permitting it to fall, means operatively related to the valve and upon which the weight falls to force the valve on its seat against the tension of the said yielding means, and means for unseating the valve, said valve being capable of movement away from its seat independently with respect to the said unseating means.

18. A filling machine embodying a filling tube provided with an open discharge end and having a source of liquid supply, a valve seat in the tube remote from the discharge end, a valve, means whereby said valve will yieldingly engage its seat to shut off the supply of liquid to the tube and maintain a column of liquid in the tube between the valve seat and the open discharge end, a float connected with the valve for controlling the valve, a valve stem, and means adapted to fall upon the valve stem when the valve is seated to compress the said yielding means.

19. A filling machine embodying a filling tube provided with an open discharge end and having a source of liquid supply, a valve seat in the tube remote from the discharge end, a valve, means whereby said valve will yieldingly engage its seat to shut off the supply of liquid to the tube and maintain a column of liquid in the tube between the valve seat and the open discharge end, a float connected with the valve for controlling the valve, a valve stem, means adapted to fall upon the valve stem when the valve is seated to compress the said yielding means, and with respect to which the tube is movable, and means for elevating the second said means as the tube approaches the latter.

20. A filling machine embodying a filling tube provided with an open discharge end and having a source of liquid supply, a valve seat in the tube remote from the discharge end, a valve, means whereby said valve will yieldingly engage its seat to shut off the supply of liquid to the tube and maintain a column of liquid in the tube between the valve seat and the open discharge end, a float connected with the valve for controlling the valve, a valve stem, means adapted to fall upon the valve stem when the valve is seated to compress the said yielding means, and with respect to which the tube is movable, means for elevating the second said means as the tube approaches the latter, and means operatively related to the last recited means for unseating the valve.

21. A filling machine embodying a filling tube provided with an open discharge end and having a source of liquid supply, a valve seat in the tube remote from the discharge end, a valve, means whereby said valve will yieldingly engage its seat to shut off the supply of liquid to the tube and maintain a column of liquid in the tube between the valve seat and the open discharge end, a float connected with the valve for controlling the valve, a valve stem, means adapted to fall upon the valve stem when the valve is seated to compress the said yielding means, and with respect to which the tube is movable, means for elevating the second said means as the tube approaches the latter, said stem being provided with a shoulder and means operatively related to the last recited means and adapted to engage the said shoulder to unseat the valve.

22. A filling machine embodying a filling tube provided with an open discharge end and having a source of liquid supply, a valve seat in the tube remote from the discharge end, a valve, means whereby said valve will yieldingly engage its seat to shut off the supply of liquid to the tube and maintain a column of liquid in the tube between the valve seat and the open discharge end, a float connected with the valve for controlling the valve, a valve stem, means adapted to fall upon the valve stem when the valve is seated to compress the said yielding means, and with respect to which the tube is movable, means for elevating the second said means as the tube approaches the latter, said stem being provided with a shoulder and means operatively related to the last recited means and adapted to engage the said shoulder to unseat the valve, said valve and stem being capable of unseating movement independently with respect to the said unseating means.

23. A filling machine embodying a filling tube provided with an open discharge end and having a source of liquid supply, a valve seat in the tube remote from the discharge end, a valve, means whereby said valve will yieldingly engage its seat to shut off the supply of liquid to the tube and maintain a column of liquid in the tube between the valve seat and the open discharge end, a float connected with the valve for controlling the valve, a valve stem, means adapted to fall upon the valve stem when the valve is seated to compress the said yielding means, and with respect to which the tube is movable, means for elevating the second said means as the tube approaches the latter, said stem being provided with a shoulder, means operatively related to the last recited means and adapted to engage the said shoulder to unseat the valve, said valve being capable of unseating movement independently with respect to the said unseating means, and means for limiting such independent unseating movement.

24. A filling machine embodying a filling tube provided with an open discharge end and having a source of liquid supply, a valve seat in the tube remote from the discharge end, a valve, means whereby said valve will yieldingly engage its seat to shut off the supply of liquid to the tube and maintain a column of liquid in the tube between the valve seat and the open discharge end, a float connected with the valve for controlling the valve, a valve stem, means adapted to fall upon the valve stem when the valve is seated to compress the said yielding means, and with respect to which the tube is movable, and means for elevating the second said means as the tube approaches the latter, said valve and stem being capable of unseating movement independently with respect to the said unseating means, the said stem and last recited means being one provided with spaced shoulders and the other with a projection adapted to engage one of the shoulders to unseat the valve and to engage the other shoulder to limit the unseating movement of the valve.

25. A filling machine embodying a filling tube provided with an open discharge end and having a source of supply of liquid, means remote from the discharge end of the tube for shutting off the supply of liquid thereto and for maintaining a column of liquid in the tube between the open discharge end and the said means, said discharge end of the tube being adapted to project into a vessel, and means controlled by the presence of the vessel for controlling the first recited means.

26. A filling machine embodying a filling tube provided with an open discharge end and having a source of supply of liquid, means remote from the discharge end of the tube for shutting off the supply of liquid thereto and for maintaining a column of liquid in the tube between the open discharge end and the said means, said discharge end of the tube being adapted to project into a vessel, means controlled by the presence of the vessel for controlling the first recited means, and means adapted to impart a sudden movement to the column of liquid for removing the liquid from the extremity of the tube after the vessel is filled and while the column of liquid is maintained in the tube.

27. A filling machine embodying a filling tube provided with an open discharge end and having a source of supply of liquid, means remote from the discharge end of the tube for shutting off the supply of liquid thereto and for maintaining a column of liquid in the tube between the open discharge end and the said means, said discharge end of the tube being adapted to project into a vessel, means adapted to be set by the vessel when the latter is in position with respect to the tube, and means for actuating the last said means when thus set to control the first recited means.

28. A filling machine embodying a filling tube provided with an open discharge end and having a source of supply of liquid, means remote from the discharge end of the tube for shutting off the supply of liquid thereto and for maintaining a column of liquid in the tube between the open discharge end and the said means, said discharge end of the tube being adapted to project into the vessel, means adapted to be set by the vessel when the latter is in position with respect to the tube, and positive means for automatically actuating the last said means when thus set to control the first recited means.

29. A filling machine embodying a filling tube provided with an open discharge end and having a source of supply of liquid, a valve remote from the discharge end of the tube for shutting off the supply of liquid thereto and for maintaining a column of liquid in the tube between the open discharge end and the said means, said discharge end of the tube being adapted to project into a vessel, means adapted to be set by the vessel when the latter is in position with respect to the tube, means for actuating the last said means when thus set to unseat the valve, said valve being capable of unseating movement independently with respect to the unseating means and means for limiting such independent unseating movement of the valve.

30. A filling machine embodying a filling tube provided with an open discharge end and having a source of supply of liquid, a valve remote from the discharge end of the tube for shutting off the supply of liquid thereto and for maintaining a column of liquid in the tube between the open discharge end and the said means, said discharge end of the tube being adapted to project into a vessel, means adapted to be set by the vessel when the latter is in position with respect to the tube, means for actuating the last said means when thus set to unseat the valve, said valve being capable of unseating movement independently with respect to the unseating means, and means operatively related to the valve and coöperating with the said unseating means for limiting such independent unseating movement.

31. A filling machine embodying a tank having a source of supply of liquid, a filling tube communicating with the tank and having a discharge end, means for controlling the discharge of liquid from the tube, said tank being disposed in a position inclined to the horizontal, and means for moving the tank and tube to cause the inlet of the latter to stand above the level of the liquid in the tank during a portion of its movement, and below the level of the liquid during the remaining portion of its movement.

32. The combination with a reservoir having an inclined mounting, of a filling tube coöperating therewith, and means for rotating said reservoir and tube so that during a portion of said rotation the end of the filling tube connecting with said reservoir will be below the liquid level of said reservoir and during the remainder of the rotation thereof above the liquid level of said reservoir.

33. A filling machine embodying a tank having a source of supply of liquid, a filling tube communicating with the tank and having a discharge end, means for controlling the discharge of liquid from the tube, said tank being disposed in a position inclined to the horizontal, means for moving the tank and tube to cause the inlet of the latter to stand above the level of the liquid in the tank during a portion of its movement and below the level of the liquid during the remaining portion of its movement, means for supplying vessels to the tube to be filled thereby, and means controlled by the said vessels for actuating the liquid discharge controlling means.

34. A filling machine embodying a tank having a source of supply of liquid, a filling tube communicating with the tank and having a discharge end, means for controlling the discharge of liquid from the tube, means for supplying vessels to the tube to be filled thereby, and means controlled by the liquid in the tank for regulating the said supply of vessels.

35. A filling machine embodying a tank having a source of supply of liquid, a filling tube communicating with the tank and having a discharge end, means for controlling the discharge of liquid from the tube, means for supplying vessels to the tube to be filled thereby, means controlled by the liquid in the tank for regulating the said supply of vessels, the last said means embodying pivotally connected arms, means tending normally to separate the arms, and automatically actuated means for holding the arms against separation.

36. A filling machine embodying a tank having a source of supply of liquid, a filling tube communicating with the tank and having a discharge end, means for controlling the discharge of liquid from the tube, means for supplying vessels to the tube to be filled thereby, means controlled by the liquid in the tank for regulating the said supply of vessels, the last said means embodying a float in the tank, pivotally connected arms, means tending normally to separate the arms, and means on the float adapted to engage both arms for holding the arms against separation by the last said means and adapted to move out of engagement with the arms when the liquid in the tank is below a predetermined level.

37. A filling machine embodying a tank having a source of supply of liquid, a filling tube communicating with the tank and having a discharge end, means for controlling the discharge of liquid from the tube, means for supplying vessels to the tube to be filled thereby, means controlled by the liquid in the tank for regulating the said supply of vessels, the last said means embodying a float in the tank, pivotally connected arms, means tending normally to separate the arms, means on the float adapted to engage both arms for holding the arms against separation by the last said means and adapted to move out of engagement with the arms when the liquid in the tank is below a predetermined level, and means for holding the float against rotation.

38. A filling machine embodying a filling tube having an open discharge end, a valve seat in the tube remote from the said end, a valve coöperating with the seat for maintaining a column of liquid in the tube between the seat and the said open end, means for unseating the valve, means controlled by the liquid for holding the valve unseated and for seating the same, additional means for moving the valve toward the seat, and means for striking the valve after it is seated.

39. A filling machine embodying a filling tube, having an open discharge end, a valve seat in the tube remote from the said end, a valve coöperating with the seat for maintaining a column of liquid in the tube between the seat and the said open end, means for unseating the valve, means for holding the valve unseated and for automatically seating the valve, additional means for seating the valve, and gravity controlled means for imparting a striking movement to the valve when the latter is seated.

40. A filling machine embodying a tank, a plurality of filling tubes communicating therewith, valve mechanism in each of the tubes for controlling the discharge of liquid therethrough and for maintaining a column of liquid between the valve and discharge end of the tube, a valve stem projecting from each valve, said tubes being adapted to be inserted into receptacles, an operating rod for each valve, a cap member loosely seated on each of the rods, coöperating means on each of the cap members and the respective stems for unseating the valves when the rods are actuated, and means for actuating the rods.

41. A filling machine embodying a tank, a plurality of filling tubes communicating therewith, valve mechanism in each of the tubes for controlling the discharge of liquid therethrough and for maintaining a column of liquid between the valve and discharge end of the tube, a valve stem projecting from each valve, said tubes being adapted to be inserted into receptacles, an operating rod for each valve, a cap member loosely seated on each of the rods, guides for the rods, and means on each of the cap members and coöperating with said guides for holding the cap members against displacement.

42. A filling machine embodying a tank, a plurality of filling tubes communicating therewith, valve mechanism in each of the tubes for controlling the discharge of liquid therethrough and for maintaining a column of liquid between the valve and discharge end of the tube, a valve stem projecting from each valve, said tubes being adapted to be inserted into receptacles, an operating rod for each valve, a cap member loosely seated on each of the rods, said stems being provided with a shoulder adapted to be engaged by the cap member to unseat the valves, and means for operating the rods.

43. A filling machine embodying a tank, a plurality of filling tubes communicating therewith, valve mechanism in each of the tubes for controlling the discharge of liquid therethrough and for maintaining a column of liquid between the valve and discharge end of the tube, a valve stem projecting from each valve, said tubes being adapted to be inserted into receptacles, an operating rod for each valve, a cap member loosely seated on each of the rods, said stems being provided with a shoulder adapted to be engaged by the cap member to unseat the valves, and means for successively operating the rods.

44. A filling machine embodying a tank, a plurality of filling tubes communicating therewith, valve mechanism in each of the tubes for controlling the discharge of liquid therethrough and for maintaining a column of liquid between the valve and discharge end of the tube, a valve stem projecting from each valve, said tubes being adapted to be inserted into receptacles, an operating rod for each valve, a cap member loosely seated on each of the rods, said stems being provided with spaced shoulders, one of said shoulders being adapted to be engaged by the cap member to unseat the valve, and by the other shoulder to limit the unseating movement of the valve, and means for operating the rods.

45. A filling machine embodying a tank, a plurality of filling tubes communicating therewith, valve mechanism in each of the tubes for controlling the discharge of liquid therethrough and for maintaining a column of liquid between the valve and discharge end of the tube, a valve stem projecting from each valve, said tubes being adapted to be inserted into receptacles, an operating rod for each valve, a cap member loosely seated on each of the rods, said valves and stems being capable of independent unseating movement with relation to the respective cap members and provided with spaced shoulders, said cap members being adapted to engage one of the shoulders to unseat the valve, and to be engaged by the shoulder to limit the said independent unseating movement, and means for moving the said rods.

46. A filling machine embodying a tank, a plurality of filling tubes communicating therewith, valve mechanism in each of the tubes for controlling the discharge of liquid therethrough and for maintaining a column of liquid between the valve and discharge end of the tube, a valve stem projecting from each valve, said tubes being adapted to be inserted into receptacles, an operating rod for each valve, a cap member loosely seated on each of the rods, said valves and stems being capable of independent unseating movement with relation to the respective cap members and provided with spaced shoulders, said cap members being adapted to engage one of the shoulders to unseat the valve and to be engaged by the other shoulder to limit the said independent unseating movement, and means controlled by the vessels to be filled for moving the said rods.

47. A filling machine embodying a tank, a plurality of filling tubes communicating therewith, valve mechanism in each of the tubes for controlling the discharge of liquid therethrough and for maintaining a column of liquid between the valve and discharge end of the tube, a valve stem projecting from each valve, said tubes being adapted to be inserted into receptacles, an operating rod for each valve, a cap member loosely seated on each of the rods, said valves and stems being capable of independent unseating movement with relation to the respective cap members and provided with spaced shoulders, said cap members being adapted to engage one of the shoulders to unseat the valves and to be engaged by the other shoulder to limit the said independent unseating movement, means adapted to be set when a vessel is present to unseat the valve and to prevent the unseating of the valve when a vessel is not present, and means for actuating the last said means when set.

48. A filling machine embodying a tank, a plurality of filling tubes communicating therewith, valve mechanism in each of the tubes for controlling the discharge of liquid therethrough and for maintaining a column of liquid between the valve and discharge end of the tube, a valve stem projecting from each valve, said tubes being adapted to be inserted into receptacles, an operating rod for each valve, a cap member loosely seated on each of the rods, said valves and stems being capable of independent unseating movement with relation to the respective cap members and provided with spaced shoulders, said cap members being adapted to engage one of the shoulders to unseat the valves and to be engaged by the other shoulder to limit the said independent unseating movement, means adapted to be set when a vessel is present to unseat the valve and to prevent the unseating of the valve when a vessel is not present, means for actuating the last said means when set, means for supplying the vessels to the tubes to be filled, and means for automatically controlling said supply.

49. A filling machine embodying a tank, a plurality of filling tubes communicating therewith, valve mechanism in each of the tubes for controlling the discharge of liquid therethrough and for maintaining a column of liquid between the valve and discharge end of the tube, a valve stem projecting from each valve, said tubes being adapted to be inserted into receptacles, an operating rod for each valve, a cap member loosely seated on each of the rods, said valves and stems being capable of independent unseating movement with relation to the respective cap members and provided with spaced shoulders, said cap members being adapted to engage one of the shoulders to unseat the valves and to be engaged by the other shoulder to limit the said independent unseating movement, means adapted to be set when a vessel is present to unseat the valve and to prevent the unseating of the valve when a vessel is not present, means for actuating the last said means when set, means for feeding the vessels to the tubes to be filled, and means for automatically controlling the feeding of the vessels.

50. A filling machine embodying a tank, a plurality of filling tubes communicating therewith, valve mechanism in each of the tubes for controlling the discharge of liquid therethrough and for maintaining a column of liquid between the valve and discharge end of the tube, a valve stem projecting from each valve, said tubes being adapted to be inserted into receptacles, an operating rod for each valve, a cap member loosely seated on each of the rods, said valves and stems being capable of independent unseating movement with relation to the respective cap members and provided with spaced shoulders, said cap members being adapted to engage one of the shoulders to unseat the valves and to be engaged by the other shoulder to limit the said independent unseating movement, means adapted to be set when a vessel is present to unseat the valve and to prevent the unseating of the valve when a vessel is not present, means for actuating the last said means when set, and means for conveying the vessels away from the tube when filled.

51. A filling machine embodying filling mechanism, means for advancing the vessels, and means for removing the vessels when filled, the last said means embodying spaced members between which the vessels are received, and means for separating the members to space the vessels from each other.

52. A filling machine embodying filling mechanism, means for advancing the vessels and means for removing the vessels when filled, the last said means embodying spaced members between which the vessels are received, means for moving the members to advance the vessels and means for separating the members as the vessels are being advanced thereby to space the vessels from each other.

53. In combination in a vessel filling machine, means for removing the vessels therefrom embodying a plurality of spaced radial arms between which the vessels are received, means for rotating the arms to advance the vessels, and means for separating the arms as they are rotated.

54. In combination in a vessel filling machine, means for removing the vessels therefrom, said means embodying a plurality of radially disposed arms rotatable about a common pivot and between which arms the vessels are received, and means eccentric with said pivot for rotating the arms and for separating the arms as they are rotated about their pivot.

55. In combination a vessel filling machine, means for receiving the vessels therefrom, said means embodying a plurality of radially disposed arms rotatable about a common pivot and between which arms the vessels are received, a member provided with an annular flange having recesses to receive the edges of the respective arms, said member being rotatable about a pivot eccentric to the pivot of the said arms whereby the arms will slide freely in the recesses and be separated as the member rotates, and means for rotating the member.

56. The combination with a filling tube, of a nozzle, a yieldable connection between said nozzle and said tube, and a cap surrounding said connection and arranged to embrace the opening in a receptacle.

57. A machine of the character described embodying a filling tube, a nozzle adapted to be projected into the vessel, a cushion disposed between the nozzle and tube, to permit free lateral and longitudinal movement of the nozzle with respect to the tube, and means connecting the parts together.

58. The combination with a filling tube, of a nozzle coöperating therewith, a cap forming a connection between said nozzle and said filling tube, having an exhaust passage therethrough, a valve mounted in said exhaust passage, and a valve stem projecting beyond the face of said cap and arranged to contact with the receptacle with which the cap and nozzle coöperate to unseat said valve and open said exhaust passage.

59. The combination with a filling tube, of a cap carried thereby provided with a chamber in the lower face thereof, an exhaust passage communicating with said chamber, a valve seat in said passage, a valve stem mounted within said chamber and projecting beyond the face of said cap, and a valve carried by said stem and arranged to coöperate with the seat aforesaid, said valve being unseated by the action of the projecting terminal of the valve stem upon the vessel being filled.

60. The combination with a filling tube, of a cap carried thereby provided with a chamber in the lower face thereof, an exhaust passage communicating with said chamber, a valve seat in said passage, a valve stem mounted within said chamber and projecting beyond the face of said cap, a valve carried by said stem and arranged to coöperate with the seat aforesaid, said valve being unseated by the action of the projecting terminal of the valve stem upon the vessel being filled, and means for reseating the valve aforesaid.

61. The combination with a filling tube, of a cap surrounding the lower terminal of said filling tube, said cap having an exhaust passage therein, a removable valve seat mounted within said passage, a valve stem extending through said passage and projecting beyond the lower face of said cap, a valve coöperating with said seat and carried by said stem, and a spring surrounding said stem between said valve and the upper terminal of said exhaust passage.

62. In a machine for filling cans, a rotatable reservoir for liquid to be filled into the cans having its axis of rotation inclined to the vertical, and liquid measuring means carried by the reservoir in position to rotate in a plane parallel with the reservoir to be successively carried below and above the level of liquid within the reservoir when the latter is rotated.

63. In a machine for filling cans, a rotatable series of measuring cups, a rotatable support for the cans to be filled, conduits leading from the cups into a position to discharge into cans lodged on the can support, the axis of rotation of the series of cups and of the can support being inclined to the vertical, and means for causing liquid to flow into the cups while the latter are traversing the lower range of travel.

64. In a can filling machine, a rotatable member including a can support, measuring means for the liquid to be filled into cans lodged on the can support, means for causing liquid to flow into the measuring means, and means for directing the liquid from the measuring means to the cans, the said rotatable member having its axis of rotation inclined to the vertical and the measuring means for the liquid to be filled into the cans being rotatable in a plane parallel with the can support.

65. In a machine for filling cans, a rotatable member having its axis of rotation inclined to the vertical, said rotatable member including a can support and a liquid receptacle, a series of measuring means in position to receive liquid from the receptacle, and a corresponding series of conduits from the measuring means to cans lodged on the can support, a valve for each conduit for closing the same against the flow of fluid therethrough, and means for positively closing the valves while the measuring means are traversing the lower portion of their path of travel.

66. In a can filling machine, a liquid receptacle, and a measuring cup mounted for orbital movement about an axis inclined to the vertical, the movement of the cup carrying it into and below the level of liquid within the receptacle when in the lowermost position and above such level when in the high position.

67. In a machine for filling cans, a liquid receptacle, a measuring cup having an orbital movement about an axis inclined to the vertical to carry the cup into and out of a body of liquid in the receptacle, a conduit leading from the cup and having a discharge end adapted to enter a small perforation in a can to be filled, a valve for said conduit, and means for positively closing the valve while the cup is traversing the lower level of its orbital path.

68. In a can filling machine, a liquid receptacle, a conduit leading therefrom and having a terminal portion of reduced diameter adapted to enter a small perforation in a can to be filled, said terminal portion being sufficiently flexible to permit the bending thereof to introduce the discharge end of the terminal portion into and remove it from the can to be filled by way of the small perforation in said can.

69. In a can filling machine, a measuring cup, a float therein, a valve controlled by said float, and means for positively closing the valve irrespective of the tendency of the float.

70. In a can filling machine, a measuring cup, a conduit leading therefrom, a valve for said conduit having a buoyant member, and yielding means for causing the positive closing of the valve irrespective of the buoyant member.

71. In a can filling machine, a measuring cup movable through an orbital path, a conduit leading from said cup, a valve for said conduit having a buoyant member, and valve operating means elongated to act on the valve during a portion of the orbital movement of the cup to maintain the valve positively closed irrespective of the normal tendency of the buoyant member while the cup is traversing such portion of its orbit.

72. In a can filling machine, a rotatable series of measuring cups movable about an axis inclined to the vertical to carry the cups successively into and out of a body of liquid to be filled into the cups, a like series of conduits leading from the cups, a support for cans in operative relation to the discharge ends of the conduits, the conduits and can support being rotatable with the cups about the same inclined axis, valves individual to the cups, and means for positively closing and maintaining the valves in the closed position during the travel of the cups through the body of liquid to be filled in the cans.

73. In a can filling machine, a rotatable reservoir having its axis of rotation tilted, said reservoir carrying a series of measuring cups movable by the rotation of the reservoir into and out of receiving relation to liquid contained in the latter.

74. In a can filling machine, a rotatable reservoir having a bottom member provided with a marginal series of depending measuring cups, the reservoir being mounted for rotation about a tilted axis to maintain a body of liquid in the lower portion of said reservoir in filling relation to the cups through a portion of the orbital movement of the cups about the axis of rotation of the reservoir.

75. In a can filling machine, filling tubes having ends adapted to move into and out of cans to be filled, and means for imparting a jar to such tubes while in the cans to dislodge adherent material clinging to the interior of the tubes at the ends thereof.

76. In a can filling machine, filling tubes having ends adapted to enter small perforations in the tops of the cans to be filled, means for moving the filling tubes from the cans, and means for jarring the tubes while in the cans and subsequent to the completion of the filling operation.

77. In a can filling machine, filling tubes having outlet portions adapted to enter small perforations in the tops of cans to be filled, means for moving the tubes from the cans on the completion of the filling operation, and means for imparting a blow to each tube subsequent to the completion of the filling operation and prior to the removal of the tube from the filled can.

In testimony whereof I have signed my name to this specification, in the presence of two subscribing witnesses, on this 23rd day of February A. D. 1911.

FRED G. DICKERSON.

Witnesses:
J. H. JOCHUM, Jr.,
C. H. SEEM.